US009595829B2

(12) United States Patent
Watanabe

(10) Patent No.: US 9,595,829 B2
(45) Date of Patent: Mar. 14, 2017

(54) POWER CONTROL APPARATUS, POWER CONTROL METHOD, AND POWER CONTROL PROGRAM

(71) Applicant: Panasonic Corporation, Osaka (JP)

(72) Inventor: Kenichi Watanabe, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 244 days.

(21) Appl. No.: 14/400,662

(22) PCT Filed: May 13, 2013

(86) PCT No.: PCT/JP2013/003053
§ 371 (c)(1),
(2) Date: Nov. 12, 2014

(87) PCT Pub. No.: WO2013/172012
PCT Pub. Date: Nov. 21, 2013

(65) Prior Publication Data
US 2015/0123626 A1    May 7, 2015

(30) Foreign Application Priority Data

May 17, 2012    (JP) ................................. 2012-113784

(51) Int. Cl.
*H02J 3/18*    (2006.01)
*H02J 3/46*    (2006.01)
(Continued)

(52) U.S. Cl.
CPC    *H02J 3/18* (2013.01); *H02J 3/06* (2013.01); *H02J 3/46* (2013.01); *H02J 13/0013* (2013.01);
(Continued)

(58) Field of Classification Search
CPC . H02M 1/32; H02M 11/00; G05F 1/00; G05F 5/00
See application file for complete search history.

(56) References Cited

U.S. PATENT DOCUMENTS 9,172,245 B1* 10/2015 Lentine ..................... H02J 3/00
2011/0291857 A1* 12/2011 Hietala ..................... H03F 1/32
340/870.04
(Continued)

FOREIGN PATENT DOCUMENTS

| JP | 2008-271723 | 11/2008 |
| JP | 2009-153333 | 7/2009 |
| JP | 2011-211803 | 10/2011 |

OTHER PUBLICATIONS

International Search Report issued Jul. 30, 2013 in corresponding International Application No. PCT/JP2013/003053.

*Primary Examiner* — Jue Zhang
*Assistant Examiner* — Lakaisha Jackson
(74) *Attorney, Agent, or Firm* — Wenderoth, Lind & Ponack, L.L.P.

(57) ABSTRACT

A power control apparatus includes: a first obtainment unit which obtains a power flow value at a power flow measuring point and a voltage value at a voltage measuring point provided; a power flow control unit which calculates a first power change value, to cause the power flow value to approach a predetermined target value; a voltage control unit calculates a voltage value at the voltage measuring point when the first power has been changed by the first power change value, and sets a second power change value, based on whether or not the voltage value falls within a predetermined voltage range; and a notification unit which notifies the power adjustment apparatus of a command value for causing the power adjustment apparatus to input or output the first power changed by the first power change value and (Continued)

the second power changed by the second power change value.

13 Claims, 9 Drawing Sheets

(51) Int. Cl.
*H02J 3/06* (2006.01)
*H02J 13/00* (2006.01)
*G05F 5/00* (2006.01)
*H02M 1/32* (2007.01)
*G05F 1/00* (2006.01)
*H02J 3/00* (2006.01)

(52) U.S. Cl.
CPC ............... *G05F 1/00* (2013.01); *G05F 5/00* (2013.01); *H02J 2003/001* (2013.01); *H02J 2003/007* (2013.01); *H02M 1/32* (2013.01); *Y02E 40/30* (2013.01); *Y02E 60/76* (2013.01); *Y02E 60/7807* (2013.01); *Y04S 10/525* (2013.01); *Y04S 40/12* (2013.01); *Y04S 40/22* (2013.01)

(56) References Cited

U.S. PATENT DOCUMENTS

2012/0265354 A1* 10/2012 Zhao ..................... G05F 1/67
　　　　　　　　　　　　　　　　　　　　　　700/286
2013/0231793 A1* 9/2013 Elliott .................. G05B 15/02
　　　　　　　　　　　　　　　　　　　　　　700/292

\* cited by examiner

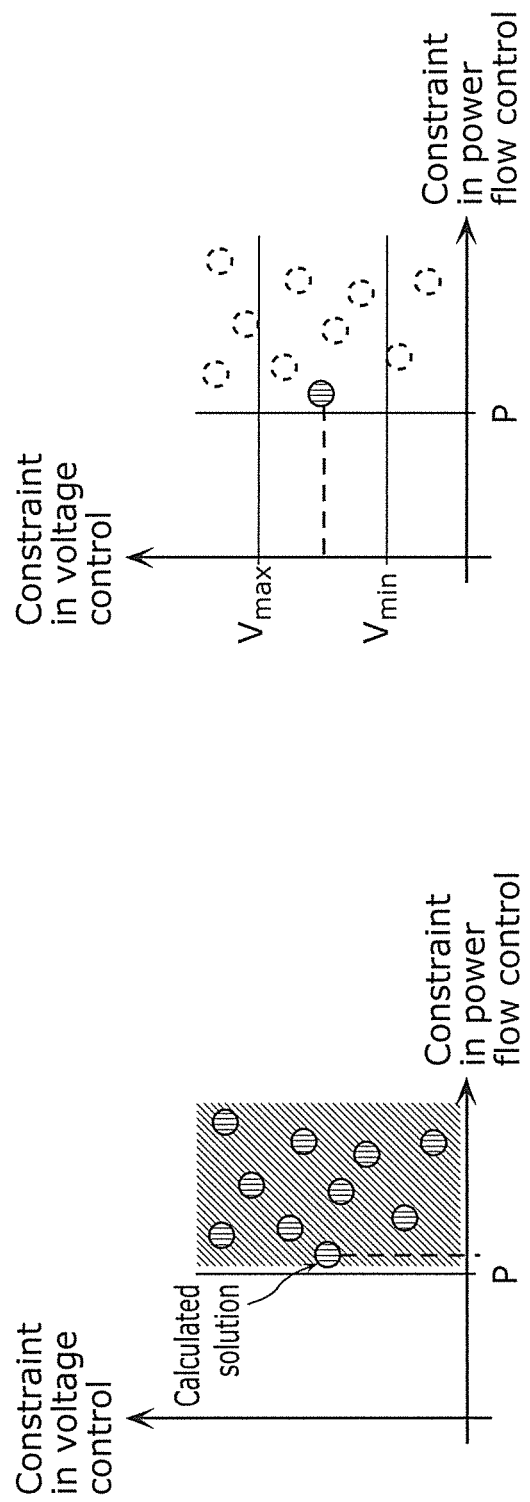

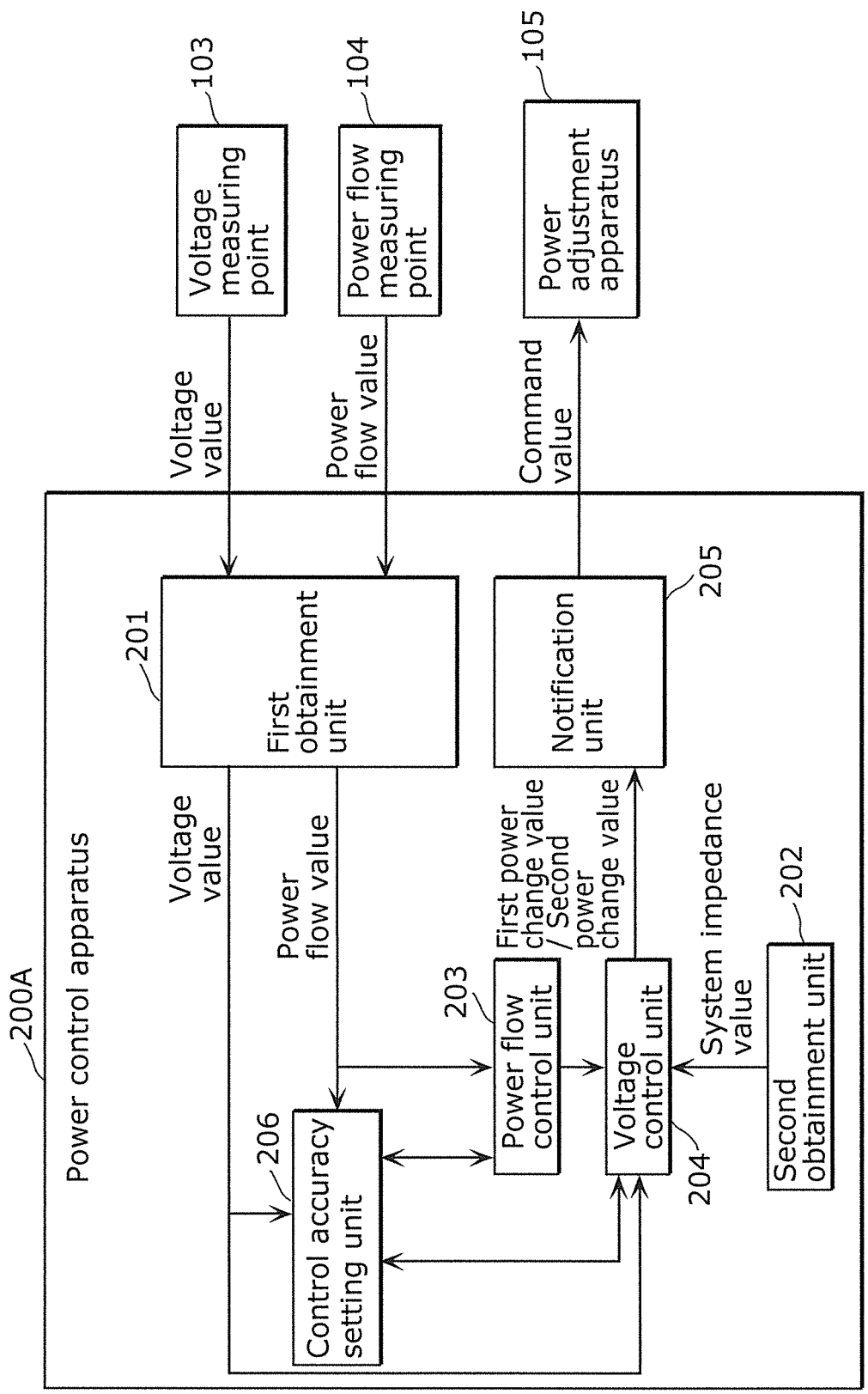

FIG. 9

| | Control unit whose control accuracy is to be higher | Power controlled by power flow control unit | Power controlled by voltage control unit | Control by power flow control unit | Control by voltage control unit |
|---|---|---|---|---|---|
| Control pattern 1 | Power flow control unit | Active power | Active power | Calculate active power change value | — |
| Control pattern 2 | Voltage control unit | Active power | Active power | — | Calculate active power change value |
| Control pattern 3 | Power flow control unit | Active power | Reactive power | Calculate active power change value | Calculate reactive power change value |
| Control pattern 4 | Voltage control unit | Active power | Reactive power | Calculate active power change value | Calculate reactive power change value |
| Control pattern 5 | Power flow control unit | Reactive power | Active power | Calculate reactive power change value | Calculate active power change value |
| Control pattern 6 | Voltage control unit | Reactive power | Active power | Calculate reactive power change value | Calculate active power change value |
| Control pattern 7 | Power flow control unit | Reactive power | Reactive power | Calculate reactive power change value | — |
| Control pattern 8 | Voltage control unit | Reactive power | Reactive power | — | Calculate reactive power change value |

POWER CONTROL APPARATUS, POWER CONTROL METHOD, AND POWER CONTROL PROGRAM

TECHNICAL FIELD

The present invention relates to power control apparatuses, power control methods, and power control programs and, in particular, to a power control apparatus, a power control method, and a power control program for controlling a power flow value and a voltage value in a power system interconnected with power adjustment apparatuses such as dispersed power sources.

BACKGROUND ART

In recent years, dispersed power sources such as a photovoltaic power generating system have been introduced in, for example, households and office buildings. Such dispersed power sources are interconnected with power systems. Of power generated by the dispersed power sources, power which has not been consumed by loads in the households and office buildings flows back to the power system as surplus power. The surplus power is then sold to a power company. However, if many dispersed power sources are interconnected with a power system, abrupt changes may occur in power flow and voltage due to, for example, reverse power flow from the dispersed power sources and simultaneous parallel off of the dispersed power sources from the power system.

As systems for controlling these changes in power flow and voltage, a microgrid, a virtual power plant, and others are suggested, for example. In these control systems, a power control apparatus for collectively controlling dispersed power sources interconnected with a power system and loads is used (e.g., Patent Literature 1). This power control apparatus performs power flow control for controlling a power flow value at an interconnection point between the dispersed power sources and an upper power system. Moreover, the power control apparatus performs voltage control for controlling a voltage value at a power reception point for the dispersed power source. Specifically, the power control apparatus concurrently calculates a control solution in the power flow control and a control solution in the voltage control, and obtains flow and voltage distribution, using, for example, power flow calculation. If the obtained flow and voltage distribution does not satisfy a constraint, the constraint is changed and the above processing is repeated from the calculation of control solutions. A disturbance in the upper system due to a change in output by the dispersed power sources and a change in load can be reduced by controlling a power flow value based on the calculated control solution in the power flow control. Moreover, power can be stably supplied to each customer in, for example, a virtual power plant, by controlling a voltage value based on the calculated control solution in the voltage control.

CITATION LIST

Patent Literature

[PTL 1] Japanese Unexamined Patent Application Publication No. 2011-211803

SUMMARY OF INVENTION

Technical Problem

However, in the conventional power control apparatus described above concurrently calculates a control solution in power flow control and a control solution in voltage control. This increases the number of equations and variables, and makes the calculation of the control solutions complicated. As another problem, calculation of a control solution is sometimes repeated until a control solution satisfying a constraint is obtained. In this case, it takes a long time to calculate the control solution.

In view of the problems, the present invention provides a power control apparatus, a power control method, and a power control program which can calculate, at a high speed, a control solution in power flow control and a control solution in voltage control.

Solution to Problem

To achieve the above object, a power control apparatus according to an aspect of the present invention is a power control apparatus for controlling a power adjustment apparatus which adjusts power in a power system through power input or output. The power control apparatus includes: a first obtainment unit that obtains a power flow value at a power flow measuring point provided in the power system and a voltage value at a voltage measuring point provided in the power system; a power flow control unit that calculates a first power change value based on the power flow value obtained by the first obtainment unit, to cause the power flow value at the power flow measuring point to approach a predetermined target value, the first power change value being a value of change in first power inputted or outputted by the power adjustment apparatus; a voltage control unit that calculates a voltage value at the voltage measuring point when the first power has been changed by the first power change value, and set a second power change value, based on whether or not the voltage value falls within a predetermined voltage range, the second power change value being a value of change in second power, the first power and the second power being inputted or outputted by the power adjustment apparatus; and a notification unit that notifies the power adjustment apparatus of a command value for causing the power adjustment apparatus to input or output the first power changed by the first power change value and the second power changed by the second power change value.

These general and specific aspects may be implemented using a system, a method, an integrated circuit, a computer program, or a non-transitory computer-readable recording medium such as a CD-ROM, or any combination of systems, methods, integrated circuits, computer programs, or recording media.

Advantageous Effects of Invention

A power control apparatus in the present invention calculates a first power change value (i.e., a control solution in power flow control), and then calculates a second power change value (i.e., a control solution in voltage control), based on the first power change value. This can simplify the calculation of the control solution in the power flow control and the control solution in the voltage control).

This can calculate the control solution in the power flow control and the control solution in the voltage control at a high speed, and stabilize a power system. Moreover, also in the case where a trade-off relationship is established between the control solution in the power flow control and the control solution in the voltage control, approximate solutions for these solutions can be calculated at a high speed.

BRIEF DESCRIPTION OF DRAWINGS

FIG. 4A is a conceptual diagram for explaining a method in which a power flow control unit calculates a first power change value, when a voltage value falls within a predetermined voltage range.

FIG. 4B is a conceptual diagram for explaining a method in which a voltage control unit determines whether a voltage value deviates from the predetermined voltage range, when the voltage value falls within the range.

FIG. 7 is a block diagram illustrating a functional configuration of a power control apparatus according to Embodiment 2.

FIG. 9 is a table illustrating patterns of control by the power control apparatus.

DESCRIPTION OF EMBODIMENTS

Figure 1:
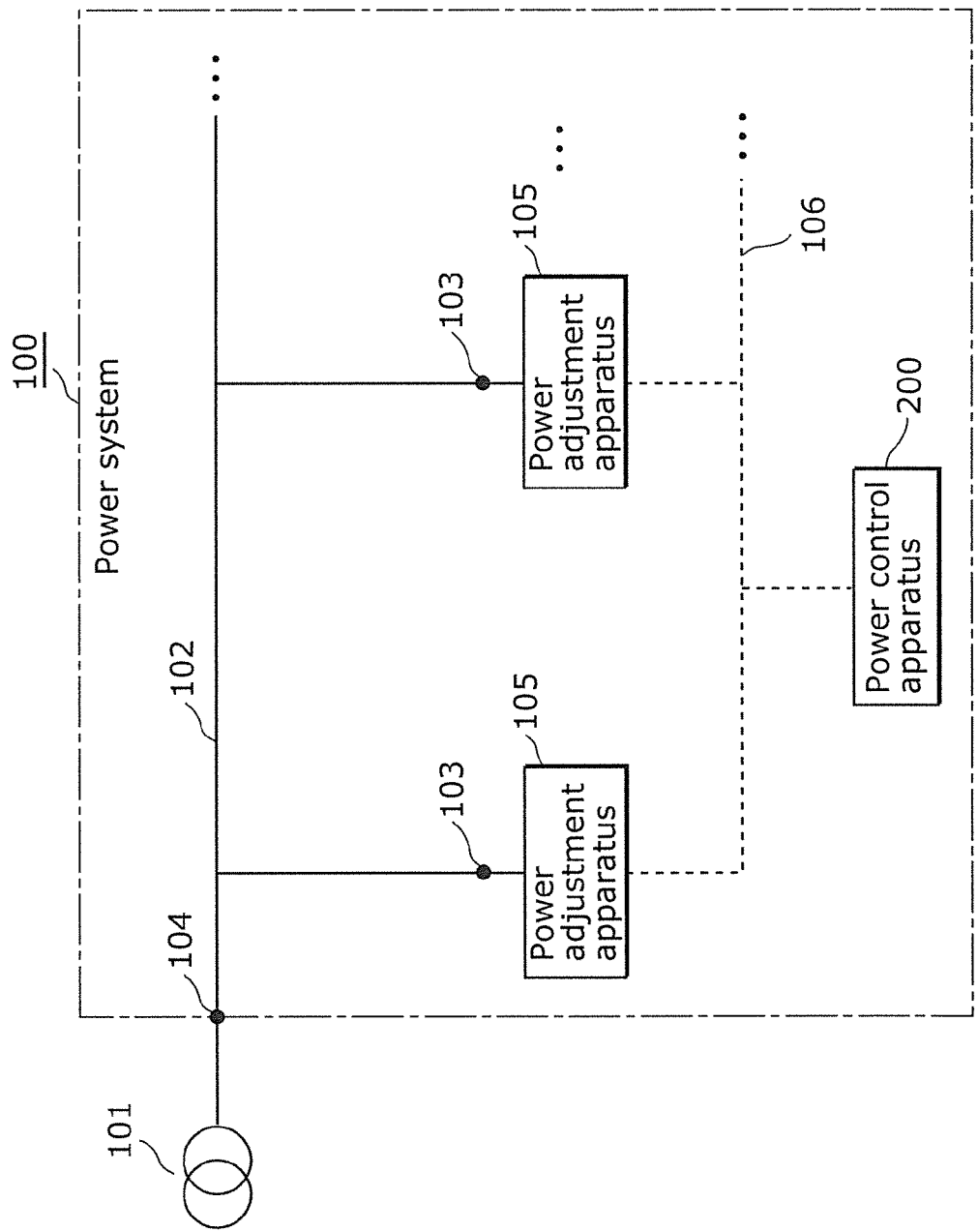
FIG. 1 is a conceptual diagram illustrating a power system in which a power control apparatus according to Embodiment 1 is provided.

Underlying Knowledge Forming Basis of the Present Disclosure

The inventor of the present application has found that the following problems arise in the power control apparatus described in [Background Art].

The power control apparatus described above concurrently calculates a control solution in power flow control and a control solution in voltage control, using mathematical programming. However, such a configuration makes calculation of the control solutions complicated, and requires a relatively long time for the calculation. Furthermore, there is the following problem. If a trade-off relationship is established between the control solution in the power flow control and the control solution in the voltage control, there is a possibility that optimum solutions in the power flow control and voltage control cannot be calculated.

Moreover, Patent Literature 1 discloses a technique for stopping calculating either the control solution in the power flow control or the control solution in the voltage control if a voltage declines and a power fluctuates in a power system due to, for example, an accident in the system. However, if the trade-off relationship continues between the control solution in the power flow control and the control solution in the voltage control, either of the control solutions cannot be calculated during the time in the technique disclosed in Patent Literature 1. This destabilizes the power system.

To solve the above problems, a power control apparatus according to an aspect of the present invention is a power control apparatus for controlling a power adjustment apparatus which adjusts power in a power system through power input or output. The power control apparatus includes: a first obtainment unit that obtains a power flow value at a power flow measuring point provided in the power system and a voltage value at a voltage measuring point provided in the power system; a power flow control unit that calculates a first power change value based on the power flow value obtained by the first obtainment unit, to cause the power flow value at the power flow measuring point to approach a predetermined target value, the first power change value being a value of change in first power inputted or outputted by the power adjustment apparatus; a voltage control unit that calculates a voltage value at the voltage measuring point when the first power has been changed by the first power change value, and set a second power change value, based on whether or not the voltage value falls within a predetermined voltage range, the second power change value being a value of change in second power, the first power and the second power being inputted or outputted by the power adjustment apparatus; and a notification unit that notifies the power adjustment apparatus of a command value for causing the power adjustment apparatus to input or output the first power changed by the first power change value and the second power changed by the second power change value.

According to this aspect, the power control apparatus calculates the first power change value (i.e., a control solution in the power flow control), and then calculates the second power change value (i.e., a control solution in the voltage control), based on the first power change value. This can simplify calculation of the control solution in the power flow control and the control solution in the voltage control. Thus, the control solution in the power flow control and the control solution in the voltage control can be calculated at a high speed, thereby stabilizing the power system. Furthermore, if a trade-off relationship is established between the control solution in the power flow control and the control solution in the voltage control, approximate solutions for these control solutions can be calculated at a high speed.

For instance, the power control apparatus may further include a second obtainment unit that obtains a system impedance value between the power adjustment apparatus and an upper system which supplies the power to the power system, in which the voltage control unit may calculate the voltage value based on the system impedance value obtained by the second obtainment unit.

According to this aspect, the voltage control unit can calculate a voltage value based on the system impedance value obtained by the second obtainment unit.

For instance, in a power control apparatus according to an aspect of the present invention, if the calculated voltage value falls within the predetermined voltage range, the voltage control unit may set the second power change value to zero.

According to this aspect, if the calculated voltage value falls within the predetermined voltage range, the voltage control unit can set the second power change value to zero.

For instance, in a power control apparatus according to an aspect of the present invention, if the calculated voltage value falls within the predetermined voltage range, the voltage control unit may set the second power change value to decrease the second power inputted or outputted by the power adjustment apparatus.

According to this aspect, if the calculated voltage value falls within the predetermined voltage range, the voltage control unit can set the second power change value to a predetermined value.

For instance, in a power control apparatus according to an aspect of the present invention, if the calculated voltage value falls outside the predetermined voltage range, the voltage control unit may determine whether or not the calculated voltage value can be set within the predetermined voltage range, and set the second power change value based on a determination result.

According to this aspect, if the calculated voltage value falls outside the predetermined voltage range, the voltage control unit can set the second power change value to a predetermined value.

For instance, in a power control apparatus according to an aspect of the present invention, in response to determining that the calculated voltage value can be set within the predetermined voltage range, the voltage control unit may set the second power change value that satisfies a predetermined constraint, based on the calculated voltage value.

According to this aspect, if the calculated voltage value can be set within the predetermined voltage range, the voltage control unit can set the second power change value to a predetermined value.

For instance, in a power control apparatus according to an aspect of the present invention, in response to determining that the calculated voltage value cannot be set within the predetermined voltage range, the voltage control unit may set the second power change value to cause the second power to approach normal rated power or zero, the second power being inputted or outputted by the power adjustment apparatus.

According to this aspect, if the calculated voltage value cannot be set within the predetermined voltage range, the voltage control unit can set the second power change value to a predetermined value.

For instance, a power control apparatus according to an aspect of the present invention may further include a control accuracy setting unit that sets a relationship in accuracy level between accuracy of power flow control by the power flow control unit and accuracy of voltage control by the voltage control unit, in which the power flow control may control a first deviation value representing a deviation of the power flow value at the power flow measuring point from the predetermined target value, the voltage control may control a second deviation value representing a deviation of the voltage value at the voltage measuring point from the predetermined voltage range, and if the first deviation value is greater than the second deviation value, the control accuracy setting unit may set the accuracy of the power flow control to be higher than the accuracy of the voltage control, and if the second deviation value is greater than the first deviation value, the control accuracy setting unit may set the accuracy of the voltage control to be higher than the accuracy of the power flow control.

According to this aspect, the control accuracy setting unit can set, based on the first deviation value and the second deviation value, a relationship in accuracy level between the accuracy of the power flow control by the power flow control unit and the accuracy of the voltage control by the voltage control unit.

For instance, a power control apparatus according to an aspect of the present invention may further include a control accuracy setting unit that sets a relationship in accuracy level between accuracy of power flow control by the power flow control unit and accuracy of voltage control by the voltage control unit, in which the power flow control may control a first deviation value representing a deviation of the power flow value at the power flow measuring point from the predetermined target value, the voltage control may control a second deviation value representing a deviation of the voltage value at the voltage measuring point from the predetermined voltage range, and if a deviation time indicated in the power flow value is longer than a deviation time indicated in the voltage value, the control accuracy setting unit may set the accuracy of the power flow control to be higher than the accuracy of the voltage control, and if the deviation time indicated in the voltage value is longer than the deviation time indicated in the power flow value, the control accuracy setting unit may set the accuracy of the voltage control to be higher than the accuracy of the power flow control.

According to this aspect, the control accuracy setting unit can set a relationship in accuracy level between the accuracy of the power flow control by the power flow control unit and the accuracy of the voltage control by the voltage control unit, based on the deviation time indicated in the first deviation value and the deviation time indicated in the second deviation value.

For instance, in a power control apparatus according to an aspect of the present invention, if the control accuracy setting unit sets the accuracy of the voltage control to be higher than the accuracy of the power flow control, the power flow control unit may calculate the first power change value with consideration of a voltage constraint that the voltage value at the voltage measuring point falls within the predetermined voltage range, and if the control accuracy setting unit sets the accuracy of the power flow control to be higher than the accuracy of the voltage control, the power flow control unit may set the first power change value without consideration of the voltage constraint.

According to this aspect, if the control accuracy setting unit sets the relationship in accuracy level between the accuracy of the power flow control and the accuracy of the voltage control, the power flow control unit can calculate the first power change value, with or without consideration of the voltage constraint.

For instance, in a power control apparatus according to an aspect of the present invention, the first power may be either active power or reactive power, and the second power may be either active power or reactive power.

According to this aspect, the first power can be either active power or reactive power, and the second power can be either active power or reactive power.

A power control method according to an aspect of the present invention is a power control method for controlling a power adjustment apparatus which adjusts power in a power system through power input or output. The power control method includes: obtaining a power flow value at a power flow measuring point provided in the power system and a voltage value at a voltage measuring point provided in the power system; calculating a first power change value based on the power flow value obtained by the first obtainment unit, to cause the power flow value at the power flow measuring point to approach a predetermined target value, the first power change value being a value of change in first power inputted or outputted by the power adjustment apparatus; calculating a voltage value at the voltage measuring point when the first power has been changed by the first power change value, and setting a second power change value, based on whether or not the voltage value falls within a predetermined voltage range, the second power change value being a value of change in second power, the first power and the second power being inputted or outputted by the power adjustment apparatus; and notifying the power adjustment apparatus of a command value for causing the power adjustment apparatus to input or output the first power changed by the first power change value and the second power changed by the second power change value.

According to this aspect, the power control method calculates the first power change value (i.e., a control solution in the power flow control), and then calculates the second power change value (i.e., a control solution in the voltage control), based on the first power change value. This can simplify calculation of the control solution in the power flow control and the control solution in the voltage control. Thus, the control solution in the power flow control and the control solution in the voltage control can be calculated at a high speed, thereby stabilizing the power system. Furthermore, even if a trade-off relationship is established between the control solution in the power flow control and the control solution in the voltage control, approximate solutions for these control solutions can be calculated at a high speed.

A program according to an aspect of the present invention is a program for controlling a power adjustment apparatus which adjusts power in a power system through power input our output. The program causing a computer to execute: obtaining a power flow value at a power flow measuring point provided in the power system and a voltage value at a voltage measuring point provided in the power system; calculating a first power change value based on the power flow value obtained by the first obtainment unit, to cause the power flow value at the power flow measuring point to approach a predetermined target value, the first power change value being a value of change in first power inputted or outputted by the power adjustment apparatus; calculating a voltage value at the voltage measuring point when the first power has been changed by the first power change value, and setting a second power change value, based on whether or not the voltage value falls within a predetermined voltage range, the second power change value being a value of change in second power, the first power and the second power being inputted or outputted by the power adjustment apparatus; and notifying the power adjustment apparatus of a command value for causing the power adjustment apparatus to input or output the first power changed by the first power change value and the second power changed by the second power change value.

According to this aspect, the power control apparatus calculates the first power change value (i.e., a control solution in the power flow control), and then calculates the second power change value (i.e., a control solution in the voltage control), based on the first power change value. This can simplify calculation of the control solution in the power flow control and the control solution in the voltage control.

That is, the first power change value (a control solution in the power flow control) is calculated, and a change in voltage to be caused by the first power change value is linearly calculated without power flow calculation. Then, the second power change value (a control solution in the voltage control) is calculated so as to also control the change in voltage. Thus, each of the step of calculating a control solution in the power flow control and the step of calculating a control solution in the voltage control may be performed once.

Thus, the control solution in the power flow control and the control solution in the voltage control can be calculated at a high speed, thereby stabilizing the power system at a higher speed than before. Furthermore, even if a trade-off relationship is established between the control solution in the power flow control and the control solution in the voltage control, approximate solutions for these control solutions can be calculated at a high speed.

It should be noted that these general and specific aspects may be implemented using a system, a method, an integrated circuit, a computer program, or a non-transitory computer-readable recording medium such as a CD-ROM, or any combination of systems, methods, integrated circuits, computer programs, or recording media.

EMBODIMENT

The following describes a power control apparatus, a power control method, and a power control program according to embodiments with reference to the drawings.

Each of the exemplary embodiments described below shows a general or specific example. The numerical values, shapes, materials, structural elements, the arrangement and connection of the structural elements, steps, the processing order of the steps, and others shown in the following exemplary embodiments are mere examples, and therefore do not limit the present invention. Moreover, among the structural elements in the following exemplary embodiments, the structural elements not recited in the independent claims representing superordinate concept are described as optional structural elements.

Embodiment 1

FIG. 1 is a conceptual diagram illustrating a power system in which a power control apparatus according to Embodiment 1 is provided. As FIG. 1 illustrates, a power system 100 includes a power line 102, voltage measuring points 103, a power flow measuring point 104, power adjustment apparatuses 105, a communication line 106, and a power control apparatus 200. This power system 100 is interconnected with a substation 101 as an upper power system via the power flow measuring point 104.

The power line 102 supplies power from the substation 101 to each of the power adjustment apparatuses 105.

The voltage measuring point 103 is, for example, a power reception point at which the power adjustment apparatus 105 and the power system 100 are interconnected and at which the power adjustment apparatus 105 can obtain a voltage value. It should be noted that a method for detecting a voltage value at the voltage measuring point 103 is not limited to one method. In the present embodiment, the voltage measuring points 103 correspond to the power adjustment apparatuses 105, respectively. It should be noted that if the power line 102 and the voltage measuring point 103 have different voltage classes, a transformer or others (not illustrated in the figure) may be provided between the power line 102 and the voltage measuring point 103.

The power flow measuring point 104 is, for example, an interconnection point between the power system 100 and the substation 101. Power flow measurement equipment (not illustrated in the figure) for detecting a power flow value at the power flow measuring point 104 is provided in the power flow measuring point 104. It should be noted that the power flow value is the value of active power or reactive power flowing through the power flow measuring point 104.

The power adjustment apparatus 105 adjusts power in the power system 100 by inputting or outputting the power. In the present embodiment, more than one power adjustment apparatus 105 is provided in the power system 100. The power adjustment apparatuses 105 are, for example, dispersed power sources. It should be noted that the dispersed power sources are, for example, dispersed power generating systems such as a photovoltaic power generating system and a fuel cell system or dispersed electric energy storage systems such as a secondary battery storage system. A dispersed power source includes a power generation device such as a solar battery, a fuel battery, and a secondary battery and a power conditioner for converting direct power generated by the power generation device from DC to AC. It should be noted that in addition to the dispersed power source, for example, a static var compensator (SVC) and a phase modifier can be used as power adjustment apparatuses 105.

If the power adjustment apparatus 105 consumes power, power from the substation 101 is inputted to the power adjustment apparatus 105 via the power flow measuring point 104, the power line 102, and the voltage measuring point 103. Meanwhile, power outputted from the power adjustment apparatus 105 is supplied to the power line 102 via a corresponding voltage measuring point 103.

The power control apparatus 200 controls each of the power adjustment apparatuses 105 to perform power flow control for controlling a power flow value at the power flow measuring point 104 and voltage control for controlling a voltage value at the voltage measuring point 103. Specifically, the power control apparatus 200 calculates a control solution in the power flow control (i.e., a first power change value which will be described later) such that the power flow value at the power flow measuring point 104 approaches a predetermined target value. Moreover, the power control apparatus 200 calculates a control solution in the voltage control (i.e., a second power change value which will be described later) such that the voltage value at the voltage measuring point 103 falls within a predetermined voltage range. The configuration of the power control apparatus 200 will be described later.

The communication line 106 establishes intercommunication between the power control apparatus 200 and each of the power adjustment apparatuses 105. Via the communication line 106, data is transferred between the power control apparatus 200 and each of the power adjustment apparatuses 105. It should be noted that the communication line 106 is, for example, the Internet, power line communication (PLC), or wireless communication of 950 MHz band.

Figure 2:
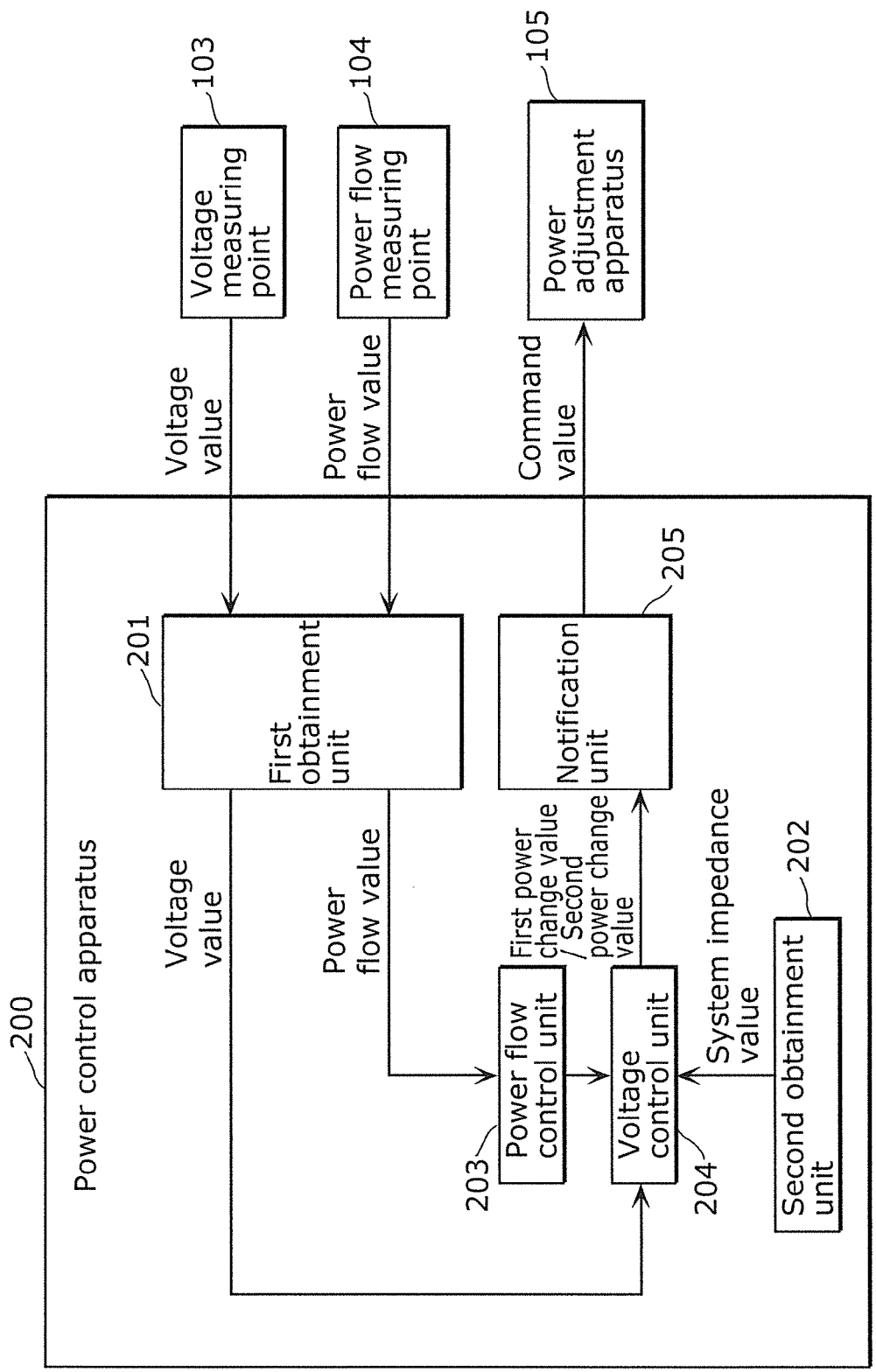
FIG. 2 is a block diagram illustrating a functional configuration of the power control apparatus in FIG. 1.

The configuration of the power control apparatus 200 mentioned above will be described. FIG. 2 is a block diagram illustrating a functional configuration of the power control apparatus in FIG. 1.

As FIG. 2 illustrates, the power control apparatus 200 includes a first obtainment unit 201, a second obtainment unit 202, a power flow control unit 203, a voltage control unit 204, and a notification unit 205.

The first obtainment unit 201 obtains a voltage value at the voltage measuring point 103. Furthermore, the first obtainment unit 201 obtains a power flow value at the power flow measuring point 104, based on a detection signal detected by the above power flow measurement equipment.

The second obtainment unit 202 obtains a system impedance value between the substation 101 and each of the power adjustment apparatuses 105. It should be noted that a method for obtaining the system impedance value is, for example, a method for obtaining a system impedance value from a server managed and operated by a power company, a method for obtaining a system impedance value from each of the power adjustment apparatuses 105, and a method for reading a system impedance value stored in, for example, a read only memory (ROM) of the power control apparatus 200.

To cause the power flow value at the power flow measuring point 104 to approach a predetermined target value, the power flow control unit 203 calculates a first power change value which is a value of change in first power inputted or outputted by each of the power adjustment apparatuses 105, based on the power flow value obtained by the first obtainment unit 201. It should be noted that the first power is either of active power and reactive power. For instance, if the power flow value controlled at the power flow measuring point 104 is the active power, the first power is the active power. If the power flow value controlled at the power flow measuring point 104 is the reactive power, the first power is the reactive power. In the present embodiment, the first power is the active power. A method for calculating the first power change value by the power flow control unit 203 will be described later.

The voltage control unit 204 calculates a voltage value at the voltage measuring point 103 when the first power inputted or outputted by each of the power adjustment apparatuses 105 has been changed by the first power change value. The voltage control unit 204 sets a second power change value which is the value of change in second power inputted or outputted by each of the power adjustment apparatuses 105, based on whether or not the calculated voltage value falls within a predetermined voltage range. It should be noted that the predetermined voltage range is, for example, an appropriate voltage range for low voltage customers (101±6V, 202±20V) which is defined by the Grid interconnection code in Japan. Here, if a voltage value at the voltage measuring point 103 is controlled using the active power, the second power is the active power. If a voltage value at the voltage measuring point 103 is controlled using the reactive power, the second power is the reactive power. In the present embodiment, the second power is the reactive power. A method for calculating the second power change value by the voltage control unit 204 will be described later.

The notification unit 205 sets a command value for causing each of the power adjustment apparatuses 105 to input or output the first power changed by the first power change value and the second power changed by the second power change value. The notification unit 205 then notifies each of the power adjustment apparatuses 105 of the set command value. In the present embodiment, the command value is data including the first power change value calculated by the power flow control unit 203 and the second power change value set by the voltage control unit 204.

Figure 3:
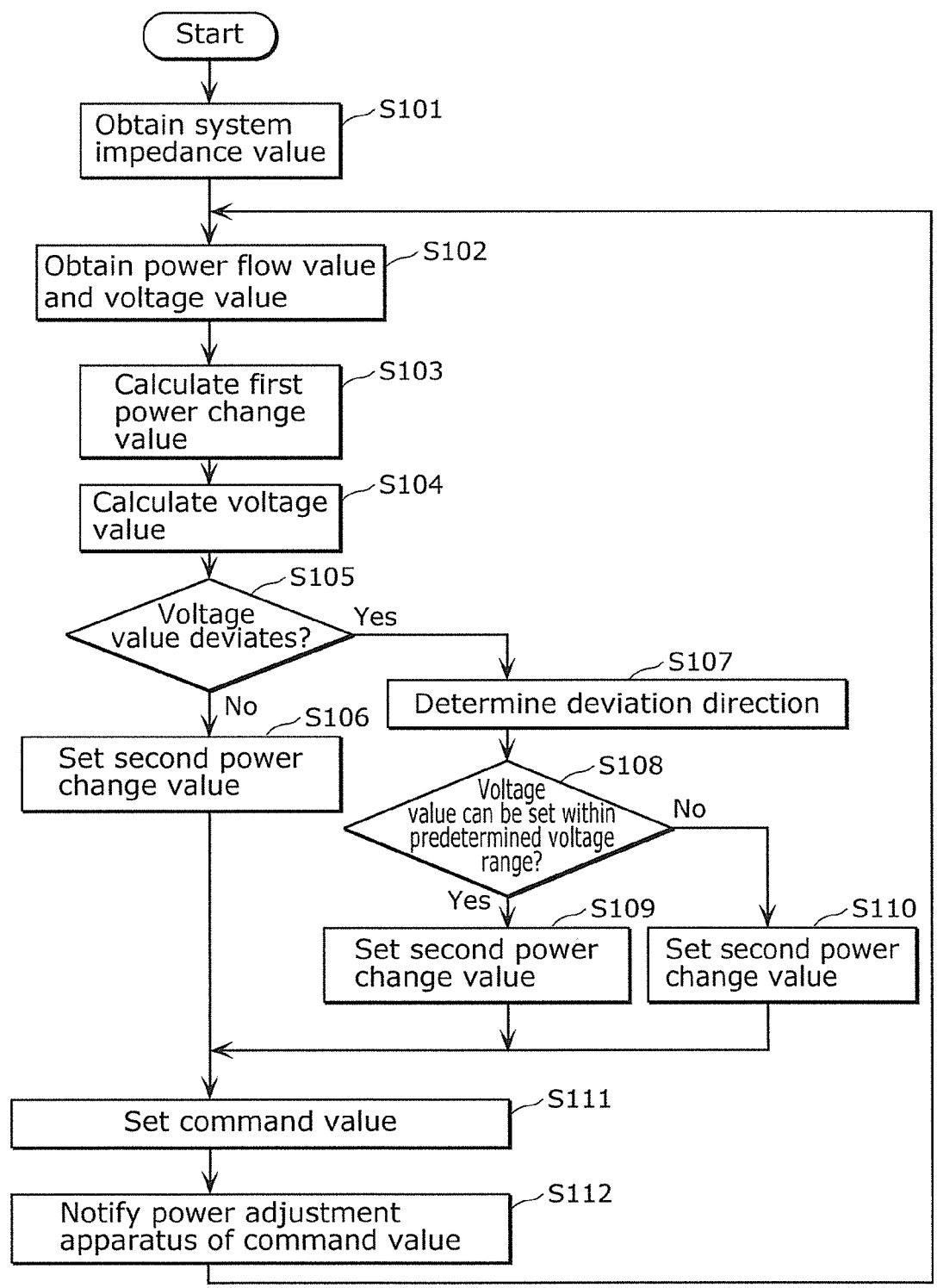
FIG. 3 is a flowchart illustrating the procedure of power control by the power control apparatus in FIG. 1.

With reference to FIG. 3, the following describes the procedure of power control by the power control apparatus 200 in the present embodiment. FIG. 3 is a flowchart illustrating the procedure of power control by the power control apparatus in FIG. 1.

The second obtainment unit 202 obtains a system impedance value between the substation 101 and each of the power adjustment apparatuses 105 (S101). It should be noted that in the present embodiment, the second obtainment unit 202 obtains the system impedance value only once. However, the second obtainment unit 202 may obtain the system impedance value for each distribution system, or regularly obtain the system impedance value.

The first obtainment unit 201 obtains a power flow value (an active power value in the present embodiment) at the power flow measuring point 104 and a voltage value at the voltage measuring point 103 (S102). The first obtainment unit 201 sends the obtained power flow value to the power flow control unit 203, and sends the obtained voltage value to the voltage control unit 204.

To cause the power flow value at the power flow measuring point 104 to approach a predetermined target value, the power flow control unit 203 calculates a first power change value based on the power flow value obtained by the first obtainment unit 201 (S103). Here, with reference to FIG. 4A, the following describes a method for calculating the first power change value by the power flow control unit 203. FIG. 4A is a conceptual diagram for explaining a method in which the power flow control unit 203 calculates the first power change value, when the voltage value falls within a predetermined voltage range. It should be noted that FIG. 4A illustrates, for simplifying explanation, the case where the number of the provided voltage measuring points 103 is one. In FIG. 4A, the horizontal axis represents a constraint in power flow control by the power flow control unit 203 (see Expression 2 described later). Meanwhile, the vertical axis represents a constraint in voltage control by the voltage control unit 204 (see Expression 4 described later). Moreover, P in FIG. 4A represents the above predetermined target value at the power flow measuring point 104. It should be noted that in Expression 2 below, a permissible error range is set for the predetermined target value P. Meanwhile, FIG. 4A illustrates only a positive permissible error range (the range represented by the oblique lines), for simplifying explanation.

Under the predetermined constraint, the power flow control unit 203 calculates an optimization problem for minimizing a total cost by the mathematical programming. As represented by the following Expression 1, an objective function used in this calculation is a function for distributing the first power inputted or outputted by each of the power adjustment apparatuses 105, according to the characteristics of each of the power adjustment apparatuses 105 (e.g., fuel expenses, operation efficiency, and remaining capacity).

[Math. 1]

$$\alpha_1(P_1+\Delta P_1)+ \ldots +\alpha_n(P_n+\Delta P_n) \Rightarrow \min \quad \text{Expression 1}$$

In Expression 1 above, n represents the number of the power adjustment apparatuses 105 provided in the power system 100. $P_i$ represents the first power inputted or outputted by the power adjustment apparatus 105 identified by an identifier i ($1 \leq i \leq n$). It should be noted that $P_i$ can be obtained using, for example, a wattmeter (not illustrated in the figure) provided in the power adjustment apparatus 105 identified by the identifier i. $\Delta P_i$ represents the first power change value which is the value of change in first power inputted or outputted by the power adjustment apparatus 105 identified by the identifier i. $\alpha_i$ represents a cost generated when the first power changed by the first power change value ($P_i+\Delta P_i$) is inputted or outputted by the power adjustment apparatus 105 identified by the identifier i.

It should be noted that in the present embodiment, $\alpha_i$ represents a cost. However, $\alpha_i$ may represent, for example, an operation efficiency or a remaining capacity as described above. Moreover, Expression 1 above uses the first power changed by the first power change value ($P_i+\Delta P_i$). However, the first power change value ($\Delta P_i$) may be used.

Moreover, the above predetermined constraint requires that the total of the first power change values for the power adjustment apparatuses 105 is within plus and minus the permissible error of a value obtained by multiplying a difference between a power flow value at the power flow measuring point 104 and a predetermined target value by a coefficient.

[Math. 2]

$$C(P_{target\ value}-P_{power\ flow\ value})-d \leq (\Delta P_1+ \ldots +\Delta P_n) \leq$$
$$c(P_{target\ value}-P_{power\ flow\ value})+d \quad \text{Expression 2}$$

In Expression 2 above, c represents the coefficient which takes a value from 0 to 1. $P_{power\ flow\ value}$ represents the power flow value at the power flow measuring point 104 obtained by the first obtainment unit 201. $P_{target\ value}$ represents the predetermined target value which the power flow value at the power flow measuring point 104 should approach. Moreover, d represents a permissible error.

The power flow control unit 203 calculates, as an optimum value, the first power change value ($\Delta P_i$) which satisfies the constraint in Expression 2 above and minimizes the objective function in Expression 1 above. In this way, the power flow control unit 203 calculates the first power change value ($\Delta P_i$) as a control solution in the power flow control.

Subsequently, the voltage control unit 204 calculates a voltage value at the voltage measuring point 103 when the first power inputted or outputted by the power adjustment apparatus 105 has been changed by the first power change value (S104). Expression 3 below is used for calculation of the voltage value by the voltage control unit 204.

[Math. 3]

$$\begin{bmatrix} \Delta V_1 \\ \vdots \\ \Delta V_n \end{bmatrix} = [A] \begin{bmatrix} \Delta P_1 \\ \vdots \\ \Delta P_n \end{bmatrix} \quad \text{Expression 3}$$

In Expression 3 above, A represents a matrix whose components are coefficients ($=dV_h/dP_i$) representing control sensitivity, and is calculated based on the system impedance value obtained by the second obtainment unit 202. For instance, Expression 4 below can calculate components $A_{hi}$ of the matrix A.

[Math. 4]

$$A_{hi} = \frac{\min(r_i, r_h)}{V_h} \quad \text{Expression 4}$$

In Expression 4 above, $r_i$ is the value of a resistance component in the system impedance value obtained by the second obtainment unit 202. Moreover, $r_i$ is a resistance value between the substation 101 and the voltage measuring point 103 identified by the identifier i. $r_h$ is a resistance value between the substation 101 and the voltage measuring point 103 identified by an identifier h. It should be noted that Expression 4 above is just an example, and a simple expression is used for simplifying explanation. A more detailed calculation equation can also be used which includes, for example, a reactance component in the system impedance value obtained by the second obtainment unit 202.

It should be noted that $A_{hi}$ can also be determined by measuring a voltage change value $\Delta V_h$ at the voltage measuring point 103 identified by the identifier h when the power adjustment apparatus 105 identified by the identifier i changed output of active power by $\Delta P_i$.

Moreover, $\Delta V_i$ is a voltage change value at the voltage measuring point 103 corresponding to the power adjustment apparatus 105 identified by the identifier i when the first power inputted or outputted by the power adjustment apparatus 105 has been changed by the first power change value. It should be noted that in the present embodiment, the voltage measuring point 103 is a power reception point for the power adjustment apparatus 105. Therefore, the maximum number of $\Delta V_i$ is n. However, the number of $\Delta V_i$ is not necessarily n.

The voltage control unit 204 calculates a voltage change value ($\Delta V_i$), based on the first power change value ($\Delta P_i$) calculated by the power flow control unit 203, using Expression 3 above. The voltage control unit 204 adds the voltage value ($V_i$) obtained by the first obtainment unit 201 and the voltage change value ($\Delta V_i$) calculated by Expression 3 above, to calculate a voltage value ($V_i+\Delta V_i$) at the voltage measuring point 103 when the first power inputted or outputted by the power adjustment apparatus 105 has been changed by the first power change value ($\Delta P_i$).

Subsequently, the voltage control unit 204 determines whether the calculated voltage value ($V_i+\Delta V_i$) falls outside a predetermined voltage range, based on Expression 5 below.

[Math. 5]

$$V_{i\_min} \leq V_i+\Delta V_i \leq V_{i\_max} \quad \text{Expression 5}$$

In Expression 5 above, $V_i$ represents a voltage value obtained by the first obtainment unit 201 at the voltage measuring point 103 corresponding to the power adjustment apparatus 105 identified by the identifier i. $V_i+\Delta V_i$ represents a voltage value at the voltage measuring point 103 when the first power inputted or outputted by the power adjustment apparatus 105 identified by the identifier i has been changed by the first power change value. $V_{i\_max}$ represents the upper limit of the predetermined voltage range at the voltage measuring point 103 corresponding to the power adjustment apparatus 105 identified by the identifier i, and is, for example, 107 V. $V_{i\_min}$ represents the lower limit of the predetermined voltage range at the voltage measuring point 103 corresponding to the power adjustment apparatus 105 identified by the identifier i, and is, for example, 95 V. It should be noted that the same predetermined voltage range may be set for all the power adjustment apparatuses 105, or different ranges may be set for the power adjustment apparatuses 105, respectively.

FIG. 4B is a conceptual diagram for explaining a method in which the voltage control unit 204 determines whether a voltage value deviates from the predetermined voltage range, when the voltage value falls within the range. In FIG. 4B, $V_{max}$ represents the upper limit of the predetermined voltage range while $V_{min}$ represents the lower limit of the predetermined voltage range. As FIG. 4B illustrates, when voltage values calculated for all the voltage measuring points 103 fall within the predetermined voltage range (No in S105), the voltage control unit 204 sets, to be zero, a second power change value ($\Delta Q_i$) which is the value of change in second power inputted or outputted by each of the power adjustment apparatuses 105 (S106). As described above, if the calculated voltage values fall within the predetermined voltage range, the power control unit 204 sets the second power change value ($\Delta Q_i=0$) to be a control solution in the voltage control.

It should be noted that instead of setting the second power change value ($\Delta Q_i$) to zero, the voltage control unit 204 may calculate the second power change value ($\Delta Q_i$) such that the second power ($Q_i$) inputted or outputted by the power adjustment apparatus 105 becomes smaller.

The following describes cases in which a calculated voltage value falls outside the predetermined voltage range. FIG. 5A is a conceptual diagram for explaining a method in which the power flow control unit 203 calculates the first power change value, when the voltage value falls outside the predetermined voltage range. FIG. 5B is a conceptual diagram for explaining a method in which the voltage control unit 204 determines whether the voltage value deviates from the predetermined voltage range, when the voltage value falls outside the range.

As FIG. 5B illustrates, if one or more voltage values among voltage values calculated for one or more voltage measuring points 103 deviate from the predetermined voltage range, (Yes in S105), the voltage control unit 204 determines the deviation direction of the voltage value (S107). That is, the voltage control unit 204 determines whether a calculated voltage value exceeds the upper limit of the predetermined voltage range ($V_i+\Delta V_i > V_{i\_max}$) or falls below the lower limit of the predetermined voltage range ($V_i+\Delta V_i > V_{i\_min}$). It should be noted that the present embodiment describes the case in which the calculated voltage value is determined to exceed the upper limit of the predetermined voltage range.

Subsequently, the voltage control unit 204 determines whether the calculated voltage value can be set within the predetermined voltage range (i.e., whether or not a control solution in voltage control exists), based on Expression 6 below.

[Math. 6]

$$\begin{bmatrix} V_{1\_max}-(V_1+\Delta V_1) \\ \vdots \\ V_{n\_max}-(V_n+\Delta V_n) \end{bmatrix} < [B] \begin{bmatrix} Q_{1\_max} \\ \vdots \\ Q_{n\_max} \end{bmatrix} \quad \text{Expression 6}$$

In Expression 6 above, B represents a matrix whose components are coefficients ($=dV_h/dQ_i$) representing control sensitivity, and is calculated based on a system impedance value obtained by the second obtainment unit 202. For instance, Expression 7 below can calculate $B_{hi}$.

[Math. 7]

$$B_{hi} = -\frac{\min(x_i, x_h)}{V_h} \quad \text{Expression 7}$$

In Expression 7 above, $X_i$ is the value of a reactance component in the system impedance value obtained by the second obtainment unit 202. Moreover, $X_i$ is a reactance value between the substation 101 and the voltage measuring point 103 identified by the identifier i. $X_h$ is a reactance value between the substation 101 and the voltage measuring point 103 identified by the identifier h. It should be noted that Expression 7 above is just an example, and a simple expression is used for simplifying explanation. A more detailed calculation equation can be used which includes, for example, a resistance component in the system impedance value obtained by the second obtainment unit 202.

It should be noted that $B_{hi}$ can also be determined by measuring the voltage change value $\Delta V_h$ at the voltage measuring point 103 identified by the identifier h when the power adjustment apparatus 105 identified by the identifier i changed output of reactive power by $\Delta Q_i$.

Moreover, $Q_{i\_max}$ is the maximum value of the second power which can be outputted by the power adjustment apparatus 105 identified by the identifier i. That is, $Q_{i\_max}$ can be calculated as Expression below.

[Math. 8]

$$Q_{i\_max} = \sqrt{(normalratedpower)^2 - (P_i + \Delta P_i)^2} \qquad \text{Expression 8}$$

If $Q_{i\_max}$ satisfying Expression 6 above exists, the voltage control unit 204 determines that the voltage value at the voltage measuring point 103 can be set within the predetermined voltage range (i.e., a control solution in voltage control exists) (Yes in S108). In this case, the voltage control unit 204 calculates the second power change value that satisfies a predetermined constraint, based on the calculated voltage value. Specifically, under the predetermined constraint, the voltage control unit 204 calculates, for example, an optimization problem for minimizing a total cost, by the mathematical programming. As Expression 9 below illustrates, an objective function used in this calculation is a function for distributing the second power inputted or outputted by each of the power adjustment apparatuses 105, according to the characteristics of each of the power adjustment apparatuses 105 (e.g., fuel expenses, an operation efficiency, and a remaining capacity).

[Math. 9]

$$\beta_1(Q_1 + \Delta Q_1) + \ldots \alpha_n(Q_n + \Delta Q_n) \Rightarrow \min \qquad \text{Expression 9}$$

In FIG. 9 above, $Q_i$ represents the second power inputted or outputted by the power adjustment apparatus 105 identified by the identifier i. $\Delta Q_i$ represents the second power change value which is the value of change in second power inputted or outputted by the power adjustment apparatus 105 identified by the identifier i. $\beta_i$ represents a cost generated when the second power changed by the second power change value $(Q_i + \Delta Q_i)$ is inputted or outputted by the power adjustment apparatus 105 identified by the identifier i. It should be noted that $Q_i$ can be obtained using, for example, a wattmeter (not illustrated in the figure) provided in the power adjustment apparatus 105 identified by the identifier i.

Moreover, the above predetermined constraint can be expressed by Expression 10 below.

[Math. 10]

$$\begin{bmatrix} V_{1\_max} - (V_1 + \Delta V_1) \\ \vdots \\ V_{n\_max} - (V_n + \Delta V_n) \end{bmatrix} < [B] \begin{bmatrix} Q_1 + \Delta Q_1 \\ \vdots \\ Q_n + \Delta Q_n \end{bmatrix} \qquad \text{Expression 10}$$

The voltage control unit 204 calculates, as a control solution in the voltage control, the second power change value $(\Delta Q_i)$ which satisfies a constraint in Expression 10 above and minimizes the objective function in Expression 9 above (S109).

Figure 5C:
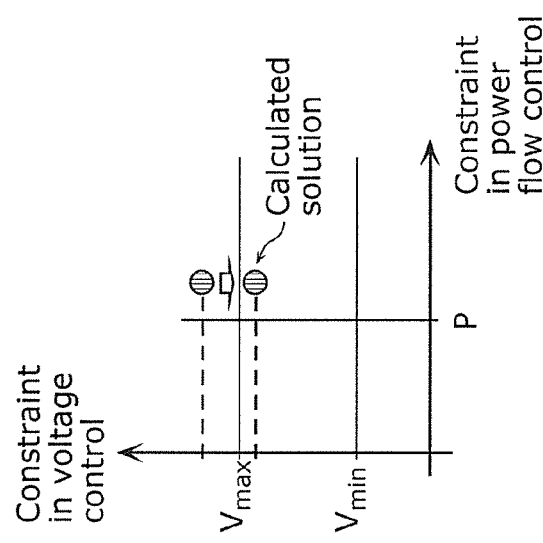
FIG. 5C is a conceptual diagram for explaining a method in which the power flow control unit calculates a second power change value, when a voltage value falls outside the predetermined voltage range.
Figure 5B:
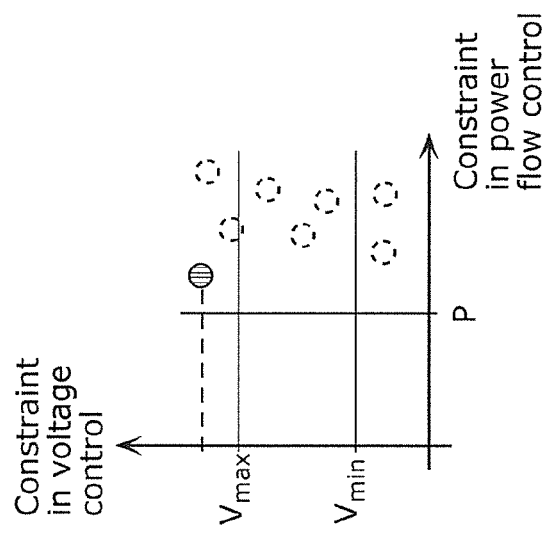
FIG. 5B is a conceptual diagram for explaining a method in which the voltage control unit determines whether a voltage value deviates from the predetermined voltage range, when the voltage value falls outside the range.
Figure 5A:
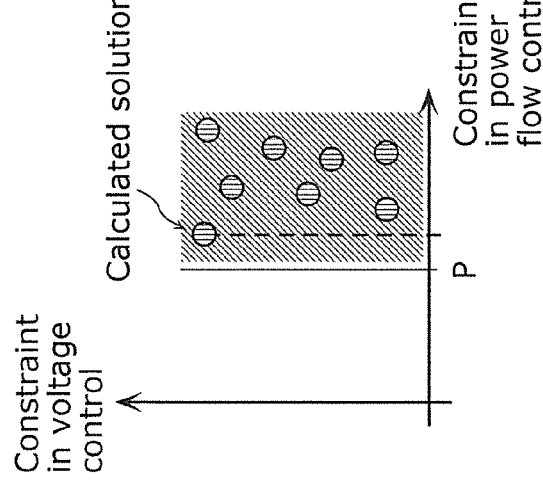
FIG. 5A is a conceptual diagram for explaining a method in which the power flow control unit calculates the first power change value, when a voltage value falls outside the predetermined voltage range.

FIG. 5C is a conceptual diagram for explaining a method in which the voltage control unit 204 calculates the second power change value, when a voltage value falls outside the predetermined voltage range. As FIG. 5C illustrates, a voltage value at the voltage measuring point 103 can be set within the predetermined voltage range by changing the second power inputted or outputted by the power adjustment apparatus 105 by the second power change value as calculated above. As described above, if the voltage value at the voltage measuring point 103 can be set within the predetermined voltage range, the voltage control unit 204 sets the second power change value $(\Delta Q_i)$ to be a control solution in the voltage control.

Meanwhile, if $Q_{i\_max}$ satisfying Expression 6 above does not exist, the voltage control unit 204 determines that the voltage value at the voltage measuring point 103 cannot be set within the predetermined voltage range (i.e., a control solution in the voltage control does not exist) (No in S108). In this case, the voltage control unit 204 obtains, using Expression 11 below, an approximate solution for the second power change value $(\Delta Q_i)$ such that the second power (Q) inputted or outputted by the power adjustment apparatus 105 approaches normal rated power $(Q_{i\_max})$ (S110).

[Math. 11]

$$\Delta Q_i = Q_{i\_max} - Q_i \qquad \text{Expression 11}$$

Figures 6A, 6B, 6C:
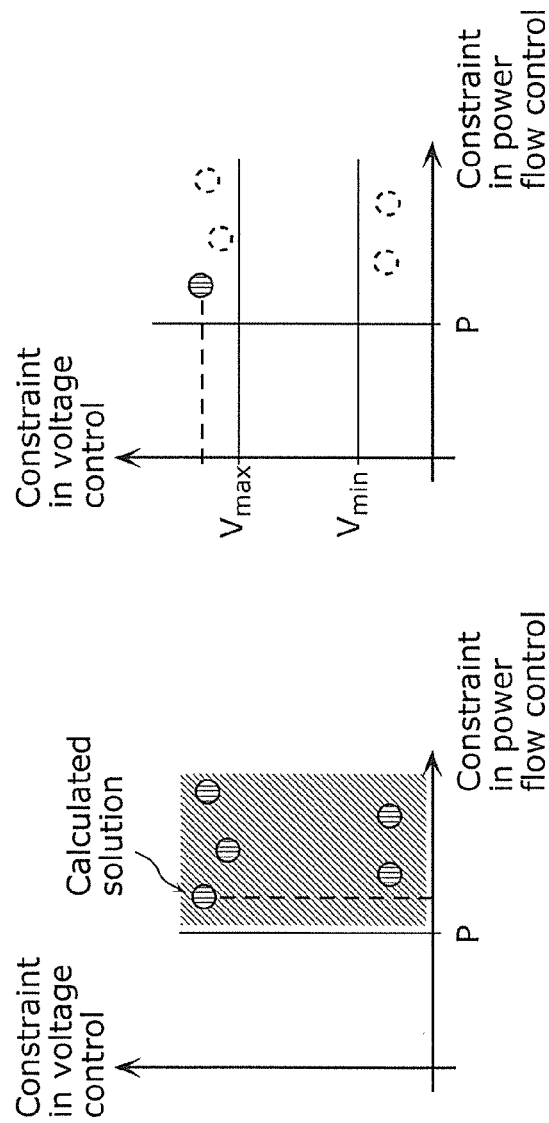
FIG. 6A is a conceptual diagram for explaining a method in which the power flow control unit calculates the first power change value, when a voltage value falls outside the predetermined voltage range.
FIG. 6B is a conceptual diagram for explaining a method in which the voltage control unit determines whether a voltage value deviates from the predetermined voltage range when the voltage value falls outside the range.
FIG. 6C is a conceptual diagram for explaining a method in which the power flow control unit calculates the second power change value, when a voltage value falls outside the predetermined voltage range.

FIG. 6A is a conceptual diagram for explaining a method in which the power flow control unit 203 calculates the first power change value, when a voltage value falls outside the predetermined voltage range. FIG. 6B is a conceptual diagram for explaining a method in which the voltage control unit 204 determines whether a voltage value falls outside the predetermined voltage range, when the voltage value falls outside the range. FIG. 6C is a conceptual diagram for explaining a method in which the voltage control unit 204 calculates the second power change value, when a voltage value falls outside the predetermined voltage range. As FIG. 6C illustrates, the voltage value at the voltage measuring point 103 can be approximated to the predetermined voltage range by changing the second power inputted or outputted by the power adjustment apparatus 105 by the second power change value as set above. Thus, if the voltage value at the voltage measuring point 103 cannot be set within the predetermined voltage range, the voltage control unit 204 sets the second power change value $(\Delta Q_i)$ to be a control solution in the voltage control.

In the final step, the notification unit 205 sets, as a command value, the first power change value $(\Delta P_i)$ calculated by the power flow control unit 203 and the second power change value $(\Delta Q_i)$ set by the voltage control unit 204 (S111). The notification unit 205 notifies each of the power adjustment apparatuses 105 of a corresponding set command value (S112). The power control apparatus 200 then repeats steps S102 to S112 described above.

It should be noted that in S110, in stead of performing the above processing, the voltage control unit 204 can set an approximate solution for the second power change value $(\Delta Q_i)$ such that the second power $(Q_i)$ inputted or outputted by the power adjustment apparatus 105 approaches zero.

As described above, the power control apparatus 200 in the present embodiment calculates the first power change value (i.e., a control solution in the power flow control), and then calculates the second power change value (i.e., a control solution in the voltage control), based on the first power change value. This can simplify calculation of the control solution in the power flow control and the control solution in the voltage control. Thus, the control solution in the power flow control and the control solution in the voltage control can be calculated at a high speed (e.g., around 10 times faster than the conventional technology), thereby stabilizing the power system 100. Furthermore, if a trade-off relationship is established between the control solution in the power flow control and the control solution in the voltage control, approximate solutions for these control solutions can be calculated at a high speed.

Embodiment 2

Figure 8:
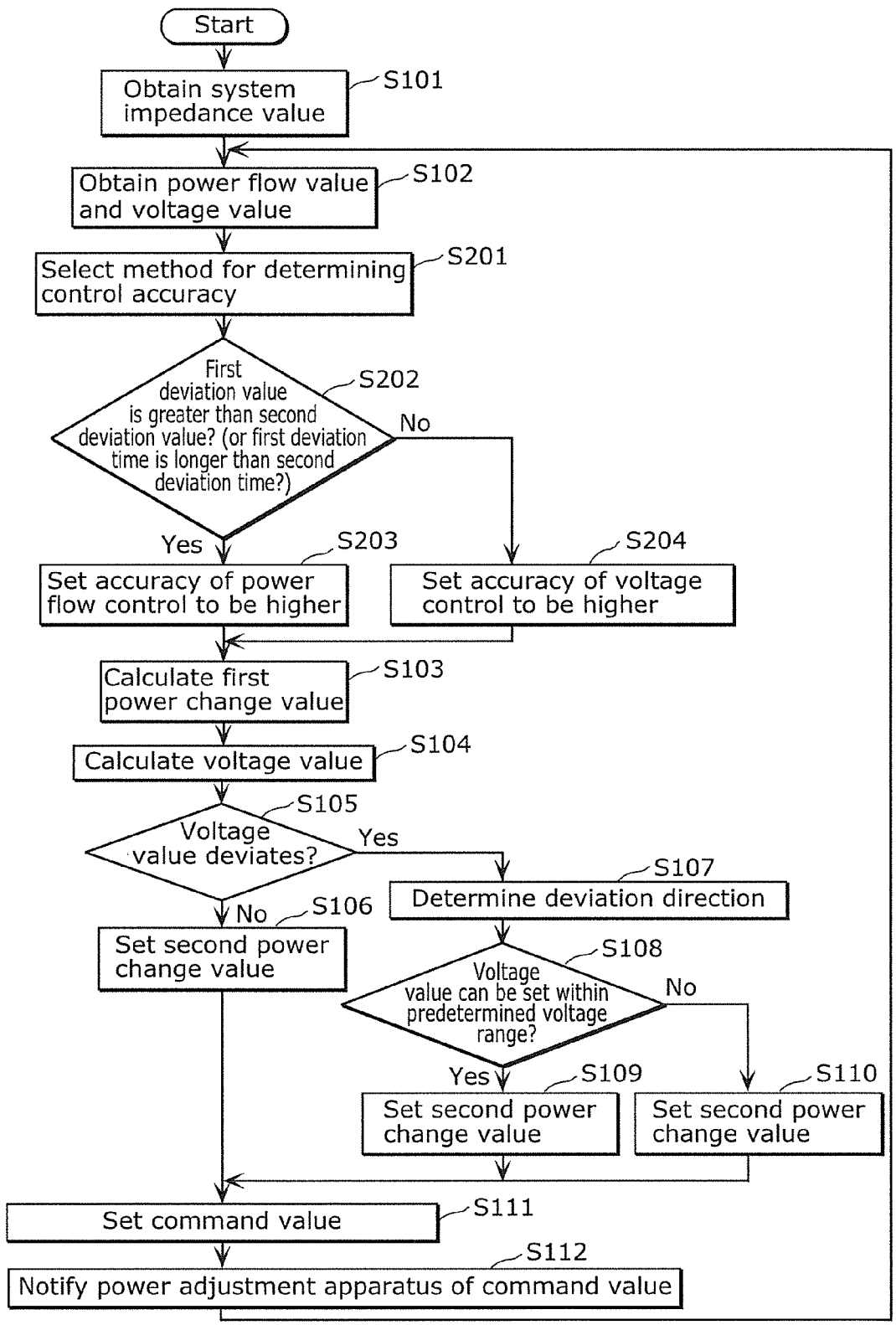
FIG. 8 is a flowchart illustrating the procedure of power control by the power control apparatus in FIG. 7.

FIG. 7 is a block diagram illustrating a functional configuration of a power control apparatus according to Embodiment 2. FIG. 8 is a flowchart illustrating the procedure of power control by the power control apparatus in FIG. 7. It should be noted that in the present embodiment, the same elements as Embodiment 1 are given the same reference signs and the explanation will be omitted.

As FIG. 7 illustrates, a power control apparatus 200A in the present embodiment further includes a control accuracy setting unit 206. This control accuracy setting unit 206 sets a relationship in accuracy level between the accuracy of power flow control by the power flow control unit 203 and the accuracy of voltage control by the voltage control unit 204. In the power flow control, a first deviation value is controlled which represents deviation of a power flow value at the power flow measuring point 104 from a predetermined target value. Meanwhile, in the voltage control, a second deviation value is controlled which represents deviation of a voltage value at the voltage measuring point 103 from a predetermined voltage range.

The control accuracy setting unit 206 selects a method for setting control accuracy, and sets the relationship in accuracy level, based on the selected method. As examples of methods for setting control accuracy, there are a method for comparing deviation values and a method for comparing deviation times.

The following describes the case where the deviation values are compared. If the first deviation value is greater than the second deviation value, the control accuracy setting unit 206 sets the accuracy of the power flow control to be higher than that of the voltage control. If the second deviation value is greater than the second deviation value, the control accuracy setting unit 206 sets the accuracy of the voltage control to be higher than that of the power flow control. It should be noted that the unit of the first deviation value is, for example, kW or kVar and the unit of the second deviation value is, for example, V. Thus, the first deviation value and the second deviation value are normalized to compare these values. For instance, the following describes the case in which the first deviation value is 0.1 kW with respect to a target value of 4 kW and the second deviation value is 2 V with respect to an upper limit of 107 V. Here, when the first deviation value is normalized, |0.1 kW|/4 kW=0.025. When the second deviation value is normalized, |2 V|/107 V=0.019. In this case, the first deviation value is greater than the second deviation value. Thus, the control accuracy setting unit 206 sets the accuracy of the power flow control to be higher than that of the voltage control.

The following describes the case where deviation times are compared. If a first deviation time during which the power flow value deviates from a predetermined target value is longer than a second deviation time during which the voltage value deviates from a predetermined voltage range, the control accuracy setting unit 206 sets the accuracy of the power flow control to be higher than that of the voltage control. Meanwhile, if the second deviation time is longer than the first deviation time, the control accuracy setting unit 206 sets the accuracy of the voltage control to be higher than that of the power flow control. It should be noted that the number of immediate continuous deviations may be used for calculating deviation time. Moreover, the first deviation value and the second deviation value may include the first deviation time and the second deviation time, respectively.

If the control accuracy setting unit 206 sets the accuracy of the voltage control to be higher than that of the power flow control, the power flow control unit 203 calculates a first power change value with consideration of a voltage constraint. This voltage constraint is represented by Expression 5 above, and is the constraint that a voltage value at the voltage measuring point 103 falls within the predetermined voltage range when the first power inputted or outputted by the power adjustment apparatus 105 has been changed by the first power change value. In this case, the power flow control unit 203 calculates the first power change value by Expressions 1, 2, and 5 above. This allows a second power change value calculated by the voltage control unit 204 to satisfy the constraint that the voltage value at the voltage measuring point 103 falls within the predetermined voltage range. Here, if a solution satisfying the constraints in Expressions 2 and 5 above does not exist, the power flow control unit 203 calculates a solution by Expressions 1 and 5 above (i.e., without using Expression 2 above). This allows the second power change value calculated by the voltage control unit 204 to satisfy the constraint that the voltage value at the voltage measuring point 103 falls within the predetermined voltage range.

Meanwhile, if the control accuracy setting unit 206 sets the accuracy of the power flow control to be higher than that of the voltage control, the power flow control unit 203 calculates the first power change value without consideration of the above voltage constraint. In this case, the power flow control unit 203 calculates the first power change value by Expressions 1 and 2 above, as with Embodiment 1. This allows the first power change value calculated by the power flow control unit 203 to satisfy the constraint that the power flow value at the power flow measuring point 104 is approximated to the predetermined target value as much as possible.

With reference to FIG. 8, the following describes the procedure of power control by the power control apparatus 200A in the present embodiment. As with Embodiment 1, the control accuracy setting unit 206 selects a method for setting control accuracy, after S101 and S102 are performed (S201). Specifically, the control accuracy setting unit 206 selects either the method for setting the relationship in accuracy level by comparing the first deviation value and the second deviation value or the method for setting the relationship in accuracy level by comparing the first deviation time and the second deviation time.

If the first deviation value is greater than the second deviation value (or the first deviation time is longer than the second deviation time) (Yes in S202), the control accuracy setting unit 206 sets the accuracy of the power flow control to be higher than that of the voltage control (S203). Meanwhile, if the second deviation value is greater than the first deviation value (or the second deviation time is longer than the first deviation time) (No in S202), the control accuracy setting unit 206 sets the accuracy of the voltage control be higher than that of the power flow control. (S204) Subsequently, S103 to S112 are performed as with Embodiment 1.

FIG. 9 is a table illustrating patterns of control by the power control apparatus. As FIG. 9 illustrates, eight control patterns 1 to 8 are illustrated as the patterns of control by the power control apparatus 200A, based on power controlled by the power flow control unit 203, power controlled by the voltage control unit 204, and which control unit has higher control accuracy. It should be noted that Embodiments 1 and 2 focus on control patterns 3 and 4 among control patterns 1 to 8.

For instance, in control pattern 1, the power flow control unit 203 controls active power (the first power) inputted or outputted by the power adjustment apparatus 105 to cause an active power value (a power flow value) at the power flow measuring point 104 to approach a predetermined target value. The voltage control unit 204 controls active power (the second power) inputted or outputted by the power adjustment apparatus 105 such that the voltage value at the voltage measuring point 103 is set within the predetermined voltage range. Moreover, in control pattern 1, the control accuracy setting unit 206 sets the accuracy of the power flow control by the power flow control unit 203 to be higher than that of the voltage control by the voltage control unit 204. Here, the active power (the first power) changed by an active power change value (the first power change value) calculated by the power flow control unit 203 is inputted or outputted by the power adjustment apparatus 105. Meanwhile, an active power change value (the second power change value) calculated by the voltage control unit 204 does not have to be taken into account (that is, the voltage control unit 204 does not have to calculate the active power change value (the second power change value)). This means that the second power change value is zero.

Moreover, in control pattern 6, the power flow control unit 203 controls reactive power (the first power) inputted or outputted by the power adjustment apparatus 105 to cause a reactive power value (a power flow value) at the power flow measuring point 104 to approach a predetermined target value. The voltage control unit 204 controls the active power (the second power) inputted or outputted by the power adjustment apparatus 105 such that the voltage value at the voltage measuring point 103 is set within the predetermined voltage range. Moreover, in control pattern 6, the control accuracy setting unit 206 sets the accuracy of the voltage control by the voltage control unit 204 to be higher than that of the power flow control by the power flow control unit 203. Here, the power flow control unit 203 calculates a reactive power change value (the first power change value) to set the voltage value at the voltage measuring point 103 within the predetermined voltage range.

It should be noted that in the above embodiments, each structural element may be dedicated hardware, or achieved by executing a software program suitable for the structural element. Each structural element may be achieved by a program execution unit such as a CPU or a processor reading and executing a software program stored in a recording medium such as a hard disk or a semiconductor memory. Here, the software for achieving, for example, the power control apparatus according to each embodiment is a program as described below.

That is, the software is a program for controlling a power adjustment apparatus which adjusts power in a power system through power input or output, the program causing a computer to execute: obtaining a power flow value at a power flow measuring point provided in the power system and a voltage value at a voltage measuring point provided in the power system; calculating a first power change value based on the power flow value obtained by the first obtainment unit, to cause the power flow value at the power flow measuring point to approach a predetermined target value, the first power change value being a value of change in first power inputted or outputted by the power adjustment apparatus; calculating a voltage value at the voltage measuring point when the first power has been changed by the first power change value, and setting a second power change value, based on whether or not the voltage value falls within a predetermined voltage range, the second power change value being a value of change in second power, the first power and the second power being inputted or outputted by the power adjustment apparatus; and notifying the power adjustment apparatus of a command value for causing the power adjustment apparatus to input or output the first power changed by the first power change value and the second power changed by the second power change value.

Thus, the power control apparatus(es), power control method(s), power control program(s) according to one or more than one aspect of the present invention were described based on the embodiments. However, the present invention is not limited to the embodiments. The one or more than one aspect of the present invention may include an embodiment obtained by making various modifications, which those skilled in the art would conceive, to the embodiment(s) without departing from the scope of the present invention and an embodiment created by combining structural elements in different embodiments.

In Embodiments 1 and 2, the voltage measuring point is provided at a power reception point for a power adjustment apparatus. However, the voltage measuring point may be provided at other given places. Moreover, in Embodiments 1 and 2, two or more voltage measuring points are provided. However, only one voltage measuring point may be provided.

In Embodiments 1 and 2, the power flow measuring point is provided at an interconnection point between a power system and a substation. However, the power flow measuring point may be provided at other given places. Moreover, in Embodiments 1 and 2, only one power flow measuring point is provided. However, two or more power flow measuring points may be provided.

In Embodiments 1 and 2, the command value is data including the first power change value calculated by the power flow control unit 203 and the second power change value set by the voltage control unit. However, the command value may be data including the first power changed by the first power change value ($P_i + \Delta P_i$) and the second power changed by the second power change value ($Q_i + \Delta Q_i$).

INDUSTRIAL APPLICABILITY

The present invention is applicable to a power control apparatus, a power control method, and a power control program for controlling a power flow value and a voltage value in a power system with which power adjustment apparatuses such as dispersed power sources are interconnected.

REFERENCE SIGNS LIST 100 power system
101 substation
102 power line
103 voltage measuring point
104 power flow measuring point
105 power adjustment apparatus
106 communication line
200, 200A power control apparatus
201 first obtainment unit
202 second obtainment unit 203 power flow control unit
204 voltage control unit
205 communication unit
206 control accuracy setting unit

The invention claimed is:

1. A power control apparatus for controlling a power adjustment apparatus which is able to input or output first power and second power to a power system, the power control apparatus comprising a communication interface and a processor:
wherein the processor executes
obtaining a power flow value at a power flow measuring point provided in the power system;
obtaining a first voltage value at a voltage measuring point provided in the power system;
deciding a first power change value based on the power flow value, to cause the power flow value at the power flow measuring point to approach a predetermined target value, the first power change value being a value of change in the first power;
deciding a second voltage value at the voltage measuring point when the first power has been changed by the first power change value;
deciding a second power change value, based on whether or not the second voltage value falls within a predetermined voltage range, the second power change value being a value of change in the second power; and
transmitting, to the power adjustment apparatus, a command value for causing the power adjustment apparatus to input or output the first power changed by the first power change value and the second power changed by the second power change value.

2. The power control apparatus according to claim 1, wherein the processor further executes obtaining a system impedance value between the power adjustment apparatus and an upper system which supplies the power to the power system, and
the second voltage value is decided based on the system impedance value.

3. The power control apparatus according to claim 1, wherein if the second voltage value falls within the predetermined voltage range, the second power change value is set to zero.

4. The power control apparatus according to claim 1, wherein if the second voltage value falls within the predetermined voltage range, the second power change value is decided to decrease the second power.

5. The power control apparatus according to claim 1, wherein if the second voltage value falls outside the predetermined voltage range, whether or not the second voltage value can be set within the predetermined voltage range is determined, and the second power change value is decided based on a determination result.

6. The power control apparatus according to claim 5, wherein in response to determining that the second voltage value can be set within the predetermined voltage range, the second power change value that satisfies a predetermined constraint is decided based on the second voltage value.

7. The power control apparatus according to claim 5, wherein in response to determining that the second voltage value cannot be set within the predetermined voltage range, the second power change value is decided to cause the second power to approach normal rated power or zero.

8. The power control apparatus according to claim 1, wherein the processor further executes deciding a relationship in accuracy level between accuracy of power flow control and accuracy of voltage control,
the power flow control controls a first deviation value representing a deviation of the power flow value at the power flow measuring point from the predetermined target value,
the voltage control controls a second deviation value representing a deviation of the first voltage value at the voltage measuring point from the predetermined voltage range, and
if the first deviation value is greater than the second deviation value, the accuracy of the power flow control is set to be higher than the accuracy of the voltage control, and
if the second deviation value is greater than the first deviation value, the accuracy of the voltage control is set to be higher than the accuracy of the power flow control.

9. The power control apparatus according to claim 1, wherein the processor further executes deciding a relationship in accuracy level between accuracy of power flow control and accuracy of voltage control,
the power flow control controls a first deviation value representing a deviation of the power flow value at the power flow measuring point from the predetermined target value,
the voltage control controls a second deviation value representing a deviation of the first voltage value at the voltage measuring point from the predetermined voltage range, and
if a deviation time indicated in the power flow value is longer than a deviation time indicated in the first voltage value, the accuracy of the power flow control is set to be higher than the accuracy of the voltage control, and
if the deviation time indicated in the first voltage value is longer than the deviation time indicated in the power flow value, the accuracy of the voltage control is set to be higher than the accuracy of the power flow control.

10. The power control apparatus according to claim 8, wherein if the accuracy of the voltage control is set to be higher than the accuracy of the power flow control, the first power change value is decided with consideration of a voltage constraint that the first voltage value at the voltage measuring point falls within the predetermined voltage range, and
if the accuracy of the power flow control is set to be higher than the accuracy of the voltage control, the first power change value is decided without consideration of the voltage constraint.

11. The power control apparatus according to claim 1, wherein the first power is either active power or reactive power, and the second power is either active power or reactive power.

12. A power control method for controlling a power adjustment apparatus which is able to input or output first power and second power, the power control method comprising:
obtaining a power flow value at a power flow measuring point provided in the power system;
obtaining a first voltage value at a voltage measuring point provided in the power system;
deciding a first power change value based on the power flow value to cause the power flow value at the power flow measuring point to approach a predetermined target value, the first power change value being a value of change in the first power;

deciding a second voltage value at the voltage measuring point when the first power has been changed by the first power change value;

deciding a second power change value, based on whether or not the second voltage value falls within a predetermined voltage range, the second power change value being a value of change in the second power; and transmitting, to the power adjustment apparatus, a command value for causing the power adjustment apparatus to input or output the first power changed by the first power change value and the second power changed by the second power change value.

13. A non-transitory computer-readable recording medium having stored thereon a program for controlling a power adjustment apparatus which is able to input or output first power and second power to a power system, the program causing a computer to execute:

obtaining a power flow value at a power flow measuring point provided in the power system;

obtaining a first voltage value at a voltage measuring point provided in the power system;

deciding a first power change value based on the power flow value to cause the power flow value at the power flow measuring point to approach a predetermined target value, the first power change value being a value of change in the first power;

deciding a second voltage value at the voltage measuring point when the first power has been changed by the first power change value;

deciding a second power change value, based on whether or not the second voltage value falls within a predetermined voltage range, the second power change value being a value of change in the second power; and transmitting, to the power adjustment apparatus, a command value for causing the power adjustment apparatus to input or output the first power changed by the first power change value and the second power changed by the second power change value.

* * * * *